Patented Dec. 2, 1941

2,264,371

UNITED STATES PATENT OFFICE 2,264,371

PROCESS OF ALKYLATING PHENOLS

Mortimer T. Harvey, East Orange, N. J., assignor, by mesne assignments, to Harvel Research Corporation, a corporation of New Jersey No Drawing. Application February 11, 1938, Serial No. 190,037

11 Claims. (Cl. 260—612)

The present application is a continuation in part of my copending application Serial Number 23,022, filed May 23, 1935, issued March 21, 1939, Patent No. 2,150,920.

I have discovered that certain tertiary alkyl alcohols and certain phenols can be condensed to form the ethers thereof and the corresponding alkyl substituted phenols with more than about one-quarter and less than one-half mole of sulphuric acid per mole of phenol as the condensing agent. Two-tenths of a mole and eight-tenths of a mole of concentrated sulphuric acid per mole of the phenol used can be stated to be practical lower and upper limits, respectively, of the amount of sulphuric acid used. With less than the lower limit the reaction is slow and more than about the upper limit at the higher concentrations is not necessary because of the speed of the reaction therewith. Under some conditions of temperature and concentration the sulphuric acid is added gradually, under other conditions the sulphuric acid can be added all at once, and illustrative examples of the practice of the present invention given below will show various ways of adding the sulphuric acid. Stated generally, the sulphuric acid is added preferably below the boiling point of the tertiary alkyl alcohol-phenol mixture; for the lower concentrations, from about sixty-five per cent to about eighty-five percent for examples, the sulphuric acid can be added at temperatures up to about 100° C., the sulphuric acid being added gradually or all at once depending on the temperature and the concentration, upon the speed of reaction desired and upon the desired purity of the reaction products; for the higher concentrations the sulphuric acid can be added advantageously at lower temperatures, for example, from about 0° C. to about 25° C. In some cases the reaction solution, after the addition of the sulphuric acid, can be warmed up or heated to speed the reaction. And these examples are given merely as general illustrations of the practice of the invention and not as limitations thereon. The invention relates generally to the alkylation of phenols with tertiary alcohol, using between about one-quarter and about one-half mole of sulphuric acid as the condensing agent, the reaction product being tertiary alkyl ethers of phenols, or tertiary alkyl substituted phenols or mixtures thereof. By this method a high yield is easily obtainable, for example, from about 90% to 100%, without sulphonation and without the formation of any substantial amount of by-products.

The condition is more advantageous for the reaction when there is a minimum amount of water in the reaction mixture so that the best condition theoretically is when the tertiary alcohol, the phenol and the sulphuric acid are substantially free of water, but commercial grades are suitable from a manufacturing standpoint, that is when there is present about thirty per cent or less water with respect to the total of sulphuric acid and water. Illustrative examples of suitable and commercially available concentrations of reagents and sulphuric acid are tertiary butyl alcohol, substantially 94% and substantially 100%; phenol (carbolic acid) 92% and 100%; and sulphuric acid, 96%, 94% and fuming. In some cases, the total amount of water can be as high as 30% calculated on total sulphuric acid and water, considered from the standpoint of practical manufacture and cost on a commercial scale.

Although the melting point of one of the materials to be reacted, tertiary alcohol or phenol, may be higher than the temperature at which the sulphuric acid is added, the solidifying point of the tertiary alcohol-phenol solution is considerably below the melting point of either of these ingredients and below the temperature at which the sulphuric acid is generally added, so that the method of the present invention has the advantage of working with liquid solutions at even the lower temperatures when desired.

According to the present invention, particularly the steps indicated above, a substantially theoretical yield of tertiary alkylated phenol is produced and the yield comprises a tertiary alkyl ether of the phenol or the corresponding tertiary alkyl substituted phenol or mixtures thereof, and this method is operative with the various phenols, including phenol (carbolic acid), the three cresols and the four xylenols, the proportion of alkyl-phenol ethers to substituted phenols in the yield varying with the particular phenol used.

Illustrative examples of the tertiary alkyl alcohols suitable for the practice of the present invention are tertiary butyl alcohol, tertiary amyl alcohol, and the various ones of the tertiary hexyl alcohols, the tertiary heptyl alcohols, the tertiary octyl alcohols, and so on.

Now, when the fraction of a mole of concentrated sulphuric acid is added to obtain the substantially completely tertiary alkylated phenol, namely the tertiary alkyl ether of the phenol or the tertiary alkyl substituted phenol or mixtures thereof, a milkiness occurs in the solution when water of reaction reaches a certain concentration and comes out of solution, and after this the water of reaction separates in a distinct layer from the reaction products. And this milkiness can be obtained directly by adding sulphuric acid at predetermined concentration and temperature or can be obtained by leaving the solution of tertiary alkyl alcohol, phenol and concentrated sulphuric acid to stand until the reaction takes place, for example, for several hours or for over night.

Further as to the temperature at which the sulphuric acid is added, it is noted that it is added at such a rate and at such a temperature that no substantial amount of sulphonation or other undesirable reaction takes place and the temperature and rate at which the sulphuric acid is added are governed to suit the degree of purity desired in the final product.

In the latter case, that is when said solution is left to stand, as for several hours or over night, about one-quarter mole to about one-half mole of concentrated sulphuric acid added gradually at lower temperatures will give complete alkylation to a mixture of tertiary alkyl ether of the phenol and tertiary alkyl substituted phenol, and to obtain milkiness in the solution. As examples of comparative times of reaction to the milky state when using less than one-half mole of sulphuric acid it is noted that when about three-tenths (0.3) of a mole of sulphuric acid is added gradually at about 15° C. to a reaction mixture or solution of tertiary butyl alcohol and phenol (carbolic acid) it takes about ten hours or more for the milkiness to appear, so generally the concentrated sulphuric acid can be added to the reaction solution in the late afternoon and left to stand overnight; and when four-tenths (0.4) of a mole of sulphuric acid is added gradually at about 15° C. the milkiness appears in about four hours. However, a difference in temperature will cause the appearance of the milkiness to be hastened or delayed. In the several comparative examples above given, the strength of reagents and sulphuric acid are the same, that is the percentage of water in each of the reagents and the sulphuric acid is the same for each of said materials, the strengths, given as illustrations, being tertiary alkyl alcohol, about 100%; phenol (carbolic acid) about 92%; and sulphuric acid, C. P. at least 94%. Variations in the amount of water affect the length of time required to reach the milky state and the time required for complete milkiness, other factors being constant.

Also, just prior to or during the appearance of the milkiness heat is generated within the reagent materials or intermediate reaction products or mixture thereof, as the case may be, but the consequent rise in temperature generally is not such as will cause sulphonation or result in other undesired reactions, and the reaction mixture can be left to stand at room temperature or at elevated temperature, as the case may be, without artificial cooling or heating.

The products obtained by condensing tertiary alkyl alcohols with phenols by using between about one-quarter and about one-half mole of concentrated sulphuric acid as the condensing agent, namely, a tertiary alkyl ether of phenol or the corresponding tertiary alkyl substituted phenol or a mixture thereof, is suitable, for example, for condensation with an aldehyde, e. g., formaldehyde, to obtain resinous materials, in which case both the said ether and substituted phenol react with the aldehyde to form the resinous product. And the products of the present invention are suitable for general use.

For purposes of further illustrating the invention the following examples are given, showing the use of various reagent materials, various concentrations (or dilutions) of sulphuric acid, and various temperatures of reaction, it being considered for purpose of illustration that water present in the tertiary alcohol or in the phenol used is calculated for the effective concentration of the sulphuric acid in the reagent solution.

*Example 1.*—About 940 grams of 100% phenol (carbolic acid) and 740 grams of 100% tertiary butyl alcohol are dissolved together in a liquid solution and 300 grams of 94% sulphuric acid is added gradually to said solution at about 15° C. to about 25° C. This is substantially 0.3 mole of the sulphuric acid per mole of phenol. The reaction materials were left to stand at room temperature, and the milky condition appeared suddenly at the end of about ten hours. The reaction product is for the most part tertiary butyl ether of phenol with some tertiary butyl phenol, and the yield is close to the theoretical, that is about 100%.

*Example 2.*—With about 940 grams of 100% phenol and 740 grams of 100% tertiary butyl alcohol and 400 grams of 94% $H_2SO_4$, under conditions similar to those of Example 1, the milky condition appeared after thirty minutes standing. In this case the amount of sulphuric acid used was about 0.4 mole per mole of phenol. Substantially the same high yield was obtained but with a slightly higher percentage of tertiary alkyl substituted phenol.

*Example 3.*—With about 940 grams of 100% phenol, 740 grams of 100% tertiary butyl alcohol and 500 grams of 94% $H_2SO_4$, under conditions similar to those of Examples 1 and 2, the milky condition appeared immediately after the sulphuric acid had all been added. This is about 0.5 mole of the sulphuric acid per mole of phenol. Here also the high yield was obtained, with a still higher proportion of substituted phenol.

*Example 4.*—With about 105 grams of 92% phenol, 74 grams of 100% tertiary butyl alcohol and 40 grams of 94% sulphuric acid, under conditions similar to those of Examples 1, 2 and 3, the milky condition appeared in about four hours. This is about 0.4 mole of sulphuric acid per mole of phenol and comparison can be taken between this example and Example 2 which also used 0.4 mole sulphuric acid per mole of phenol. The difference between these two examples is the strength (water content) of the phenol and the consequent effective dilution of the sulphuric acid, and the resulting extension of time required for milkiness, from about thirty minutes in Example 2 to about four hours in the present example.

*Example 5.*—With about 940 grams of 100% phenol, 74 grams of 100% tertiary butyl alcohol and about 570 grams of 70% sulphuric acid, it took 48 hours for milkiness to appear. This is substantially 0.4 mole of 70% sulphuric acid per mole of phenol.

*Example 6.*—To a solution of about 282 grams of 100% phenol and 222 grams of tertiary butyl alcohol which is at about 40° C. are added a solution of 45 grams of water in 120 grams of over 94% sulphuric acid, the sulphuric acid solution being at about 16° C. This is about seventy per cent sulphuric acid and the amount of sulphuric acid is about 0.4 mole with respect to the reagent materials. The sulphuric acid solution was added all at once to the reagent solution. In about ten hours milkiness appeared, and substantially one hundred per cent of mixture of tertiary butyl ether of phenol and tertiary butyl phenol was produced.

*Example 7.*—Molecular proportions of 1,4-dimethyl-2-hydroxy-benzene and tertiary butyl alcohol were dissolved together and, at a temperature between about 15° C. and 25° C., four tenths of a mole of sulphuric acid was added gradually, the sulphuric acid going completely into solution. There was water present in the sulphuric acid and the tertiary butyl alcohol to the amount which made the sulphuric acid about 90% of the total water and sulphuric acid. After the addition of the sulphuric acid, the solution was left to stand at room temperature and in about four hours the milkiness of the discharged sulphuric acid and water appeared. The reaction was substantially complete and gave a substantially theoretical yield of a mixture of the tertiaryl butyl ether of the 1,4-dimethyl-2-hydroxy-benzene and the tertiary butyl substituted 1,4-dimethyl-2-hydroxy-benzene. The 1,4-dimethyl-2-hydroxy-benzene used in this example was a commercial grade containing over 90% 1,4-dimethyl-2-hydroxy-benzene with the balance other xylenols.

*Example 8.*—Molecular proportions of substantially 100% pure tertiary amyl alcohol and phenol (carbolic acid) are dissolved together and into the solution is added gradually four-tenths of a mole of concentrated sulphuric acid (over 94%) at about 15° C. to 25° C. after which the solution was left stand at room temperature. In about one and one-half hours the solution suddenly heated up and became milky, and a sulphuric acid-water emulsion settled down in a layer beneath the condensation products of the tertiary amyl alcohol and phenol. The yield was substantially 100%.

*Example 9.*—Another reaction substantially the same as that of Example 8 above was made but in this case three-tenths of a mole of concentrated sulphuric acid was used. The result was substantially the same except that it took over four hours to become milky. The yield was substantially 100%.

With two-tenths of a mole of concentrated sulphuric acid the solution became milky but it took over twenty-four hours to become milky and the yield was somewhat less than 100%.

With eight-tenths of a mol of concentrated sulphuric acid per mole of phenol the solution became milky immediately after the sulphuric acid had all been added.

The products of reaction of each of the above particular Examples 1 to 9, inclusive, as well as of the other examples, both the general and the more particular, are suitable for reaction with compounds containing reactive methylene groups such as formaldehyde, hexamethylene tetramine, paraform, paraldehyde, furfuraldehyde, and the other well known aldehydic compounds, for making resins. These resin forming reactions can be carried on without or with a catalyst either acid or basic, in manner well known in the art of condensing phenols and formaldehyde. The ethers of the products of the present invention will react at the same time as any of the substituted phenols present therewith to form resins with the aldehydic compounds. When acid catalyst is used, a part of the acid used as the condensing agent for the phenol-tertiary alkyl alcohol condensation can be utilized. For example, in carrying on with the products of any of the examples above given for the purpose of making resins, the reaction product, tertiary alkyl ether of a phenol, or tertiary alkyl substituted phenol, or mixture of these two latter, can be washed to free it of any excess of the sulphuric acid left therein, but enough of the sulphuric acid can be left in to act as a catalyst for the condensation of the said products of said examples with an aldehyde, such as formaldehyde, with the aid of heat.

Subject matter disclosed but not claimed herein is claimed in my copending application Serial Number 256,929, filed February 17, 1939.

Having thus described my invention, what I claim and desire to protect by Letters Patent is:

1. The method of condensing aliphatic tertiary alcohols and phenols which comprises mixing a phenol of the benzene series and a tertiary alkyl alcohol in substantially equimolecular amounts, and gradually adding thereto concentrated sulphuric acid in amount between about two-tenths and about eight-tenths of a molecular amount, and allowing the resulting solution to stand until a milkiness occurs.

2. The method of condensing aliphatic tertiary alcohols and phenols which comprises mixing a phenol of the benzene series and a tertiary alkyl alcohol in substantially equimolecular amounts, and gradually adding thereto concentrated sulphuric acid in amount between about two-tenths and about eight-tenths of a molecular amount, allowing the resulting solution to stand until a milkiness occurs, and separating the water of reaction.

3. The method of condensing aliphatic tertiary alcohols and phenols which comprises mixing a phenol of the benzene series and a tertiary alkyl alcohol in substantially equimolecular amounts, and gradually adding thereto concentrated sulphuric acid in amount between about two-tenths and about eight-tenths of a molecular amount, at a temperature below the boiling point of the tertiary alkyl alcohol used and allowing the resulting solution to stand until a milkiness occurs.

4. The method which comprises mixing phenol and tertiary butyl alcohol in substantially equimolecular amounts, and gradually adding thereto concentrated sulphuric acid in amount between about two-tenths and about eight-tenths of a molecular amount, at a temperature below the boiling point of the tertiary butyl alcohol and allowing the resulting solution to stand until a milkiness occurs.

5. The method which comprises mixing substantially equimolecular proportions of phenolic material selected from the group consisting of phenol (carbolic acid), the cresols and the xylenols and a tertiary alkyl alcohol having from four to nine carbon atoms, and gradually adding thereto concentrated sulphuric acid in amount between about two-tenths and eight-tenths of a molecular amount by weight.

6. The method which comprises mixing substantially equimolecular proportions of phenolic material selected from the group consisting of phenol (carbolic acid), the cresols and the xylenols and a tertiary alkyl alcohol having from four to nine carbon atoms, and adding concentrated sulphuric acid in amount between about two-tenths and about five-tenths of a molecular amount by weight.

7. The method of condensing tertiary alcohols and phenols which comprises mixing a phenol of the benzene series and a tertiary alkyl alcohol in substantially equimolecular amounts, and gradually adding sulphuric acid to the mixture, said sulphuric acid being used in a concentration of between sixty-five per cent and one hundred per cent and in a quantity of between about two-tenths of a mole and about eight-tenths of a mole per mole of phenol used.

8. The method of making material of the group consisting of tertiary alkyl ethers of phenols, tertiary alkyl substituted phenols and mixtures thereof, which comprises adding sulphuric acid to an equimolecular mixture of a phenol of the benzene series and a tertiary alkyl alcohol as starting materials, said sulphuric acid being used in a concentration of between sixty-five per cent and one hundred per cent and in a quantity of between about two-tenths of a mole and about eight-tenths of a mole per mole of phenol used and sufficient to remove the water produced by the condensation reaction of said starting materials.

9. The method which comprises mixing substantially equimolecular proportions of a phenol of the benzene series and a tertiary alkyl alcohol as starting materials and dissolving concentrated sulphuric acid in said mixture, the sulphuric acid being used in a quantity between about two-tenths and eight-tenths of a molecular equivalent of one of said starting materials.

10. The method of condensing a tertiary alkyl alcohol and a phenol of the benzene series, which comprises forming a mixture of the selected alcohol and the selected phenol in substantially equimolecular amounts as starting materials, and gradually adding concentrated sulphuric acid to said mixture, the sulphuric acid being used in quantity between about two-tenths and eight-tenths of a molecular equivalent of one of said starting materials, and holding said sulphuric acid in said solution until it comes out of solution with water formed by the condensation of said starting materials.

11. The method which comprises forming an equimolecular mixture of a phenol of the benzene series and a tertiary alkyl alcohol and adding sulphuric acid thereto, the amount of said sulphuric acid by weight used being between about two-tenths and about eight-tenths of a molecular equivalent of said phenol, the strength of said sulphuric acid with respect to total sulphuric acid and water in said solution being between sixty-five per cent and one hundred per cent, the temperature at which the said sulphuric acid is added to said solution being between 0° C. and the boiling point of said solution, and holding said solution with said sulphuric acid dissolved therein at a temperature between 0° C. and the boiling point of said solution until said sulphuric acid comes out of solution with water formed by the condensation of said reagents.

MORTIMER T. HARVEY.